Jan. 6, 1959  F. DAWSON  2,867,189
ADHESIVE APPLYING MACHINE
Filed Sept. 20, 1954  3 Sheets-Sheet 2

Inventor:
FRED DAWSON
by John L. Smith
Attorney

Jan. 6, 1959  F. DAWSON  2,867,189
ADHESIVE APPLYING MACHINE
Filed Sept. 20, 1954  3 Sheets-Sheet 3
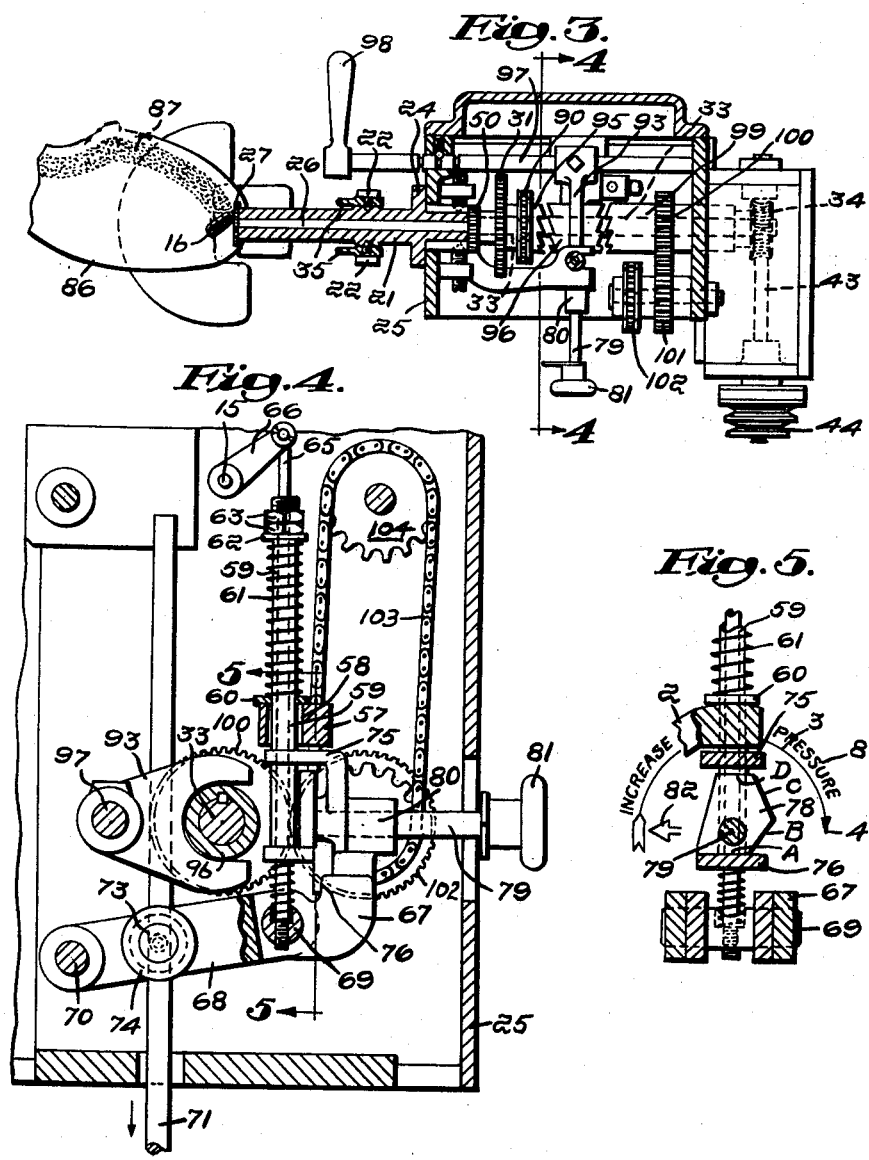
Inventor:
FRED DAWSON
by John Y. Smith
Attorney United States Patent Office 2,867,189
Patented Jan. 6, 1959

2,867,189

ADHESIVE APPLYING MACHINE

Fred Dawson, West Roxbury, Mass., assignor to Compo Shoe Machinery Corporation, Boston, Mass., a corporation of Delaware Application September 20, 1954, Serial No. 457,088

3 Claims. (Cl. 118—409)

This invention relates to machines for preparing soles for cementing to shoes, and relates more particularly to machines for applying adhesives to outsoles.

Machines such as that disclosed in the U. S. Patent No. 2,042,479 are used for applying adhesives to the marginal edges of outsoles. Such a machine includes a foot operated treadle which, when depressed, moves a feed roll in contact with a sole, and simultaneously opens a valve through which an adhesive is supplied to a nozzle which ejects the liquid upon the marginal edge of the outsole.

Leather shoe soles are usually cemented with pyroxylin. Rubber shoe soles are usually cemented with a nitrile type of adhesive or one such as neoprene. It is not desirable to contaminate a leather adhesive by passing it through a nozzle with its hose and fittings which have previously been used with a rubber adhesive, and vice versa. For this reason, separate machines have generally been used in the past for applying adhesives to leather and to rubber outsoles.

This invention provides a machine for applying adhesives to outsoles which can be used with two types of soles such as leather and rubber soles, thus achieving economies of space, labor and investment.

A feature of this invention is that a machine for applying adhesives to outsoles has a separate supply tank, pump, hose and nozzle for each of two adhesives, one for one type of sole material, and the other for another type of sole material; has a manually operated control for engaging separately the drives of the pumps, and has a solvent tank in which the inactive nozzle is stored for cleansing while the other nozzle is in use.

Another feature of this invention is that a manually operated control is provided for quickly adapting a machine for applying adhesives to outsoles, to handle soles having many different thicknesses and degrees of hardness.

An object of this invention is to provide a machine which can be used to apply one adhesive to one type of outsole, and to apply another adhesive to another type of outsole without contaminating one adhesive with the other.

Another object of this invention is to provide a machine for applying adhesives to outsoles which can quickly be adapted to handle soles having many different thicknesses and hardnesses.

This invention will now be described with reference to the annexed drawings, of which:

Fig. 3 is a sectional view along the line 3—3 of Fig. 1;

Fig. 4 is an enlarged sectional view along the line 4—4 of Fig. 3;

Fig. 5 is a sectional view along the line 5—5 of Fig. 4;

Figure 1:
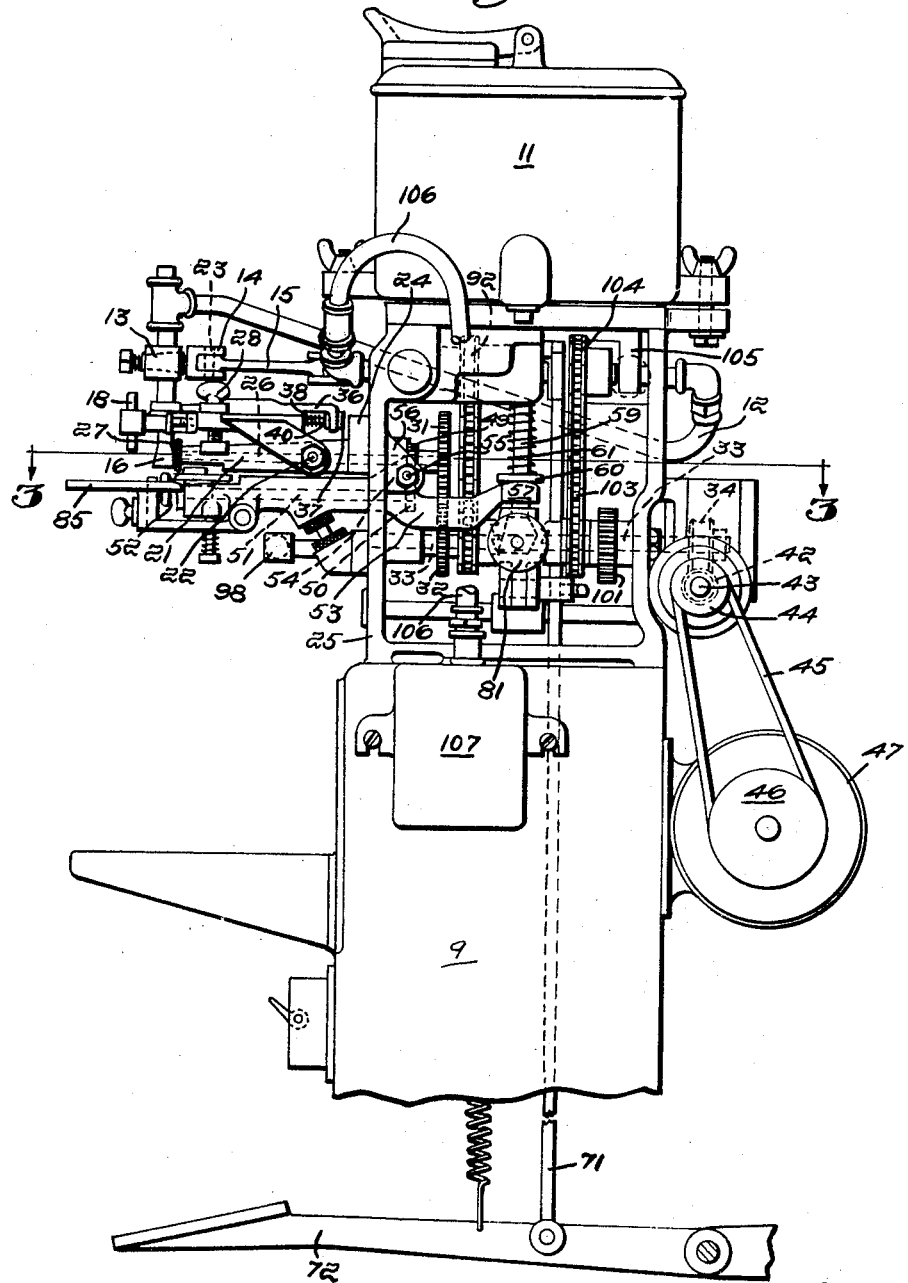
Fig. 1 is a side elevation of a machine for applying adhesives to outsoles and embodying this invention.
Figure 2:
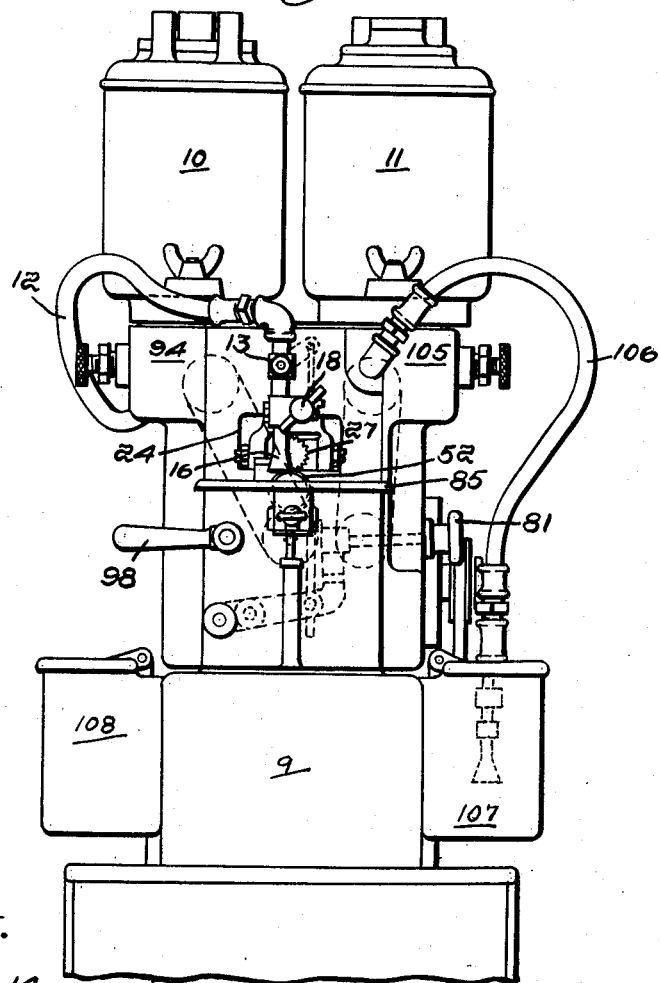
Fig. 2 is a front elevation of the machine.
Figure 6:
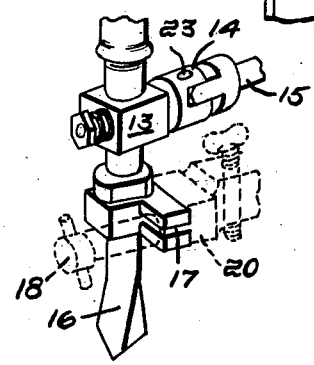
Fig. 6 is an enlarged projected view of one of the nozzles, its valve and support.
Figure 7:
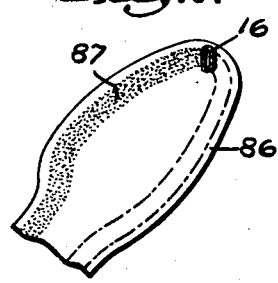
Fig. 7 is a fragmentary plan view of an outsole to which an adhesive is being applied, an adhesive applying nozzle being shown in section.

The machine comprises a frame 9 upon which are supported two adhesive tanks 10 and 11, one tank containing an adhesive for leather soles, and the other containing an adhesive for rubber soles. The tank 10 is connected through a gear pump 94 and a hose 12 to an adhesive applying nozzle assembly consisting of a valve 13 connected through a universal joint 14 to a valve operating shaft 15, and a nozzle 16. The nozzle has a portion with a slot 17 therein through which extends the inner portion of a hand-screw 18 which is threaded into the outer portion of the nozzle support 20 which has a forked inner end 35 which straddles the upper feed roll bracket 21 and is pivoted thereto by the pivot screws 22 for permitting vertical adjustment of the nozzle. A hand-screw 28 is threaded into the nozzle support 20 and its lower end contacts the flattened upper portion of the bracket 21, and is adjustable for variably limiting the down movement of the nozzle. The remainder of the nozzle supporting structure is more or less conventional and so will not be described.

The nozzle assembly can be removed by loosening the screw 18 and by sliding the slotted portion of the nozzle from around the screw 18, and removing the pin 23 from the universal joint. A solvent tank 108 is provided for receiving the removed nozzle assembly.

The upper feed roll bracket 21 has a flange 24 on its inner end which is attached to a casing 25 forming part of the frame 9, and has a horizontally extending bore in which is journalled a rotary shaft 26 on the outer end of which is secured the upper feed roll or wheel 27. The shaft 26 has a spur gear 31 on its inner end which is meshed with a similar gear 32 on one end of the drive shaft 33, the other end of which has a worm wheel 34 attached thereto and which is meshed with a worm gear 42 on a shaft 43. The shaft 43 has a pulley 44 attached thereto which is driven through a belt 45 and pulley 46 by an electric motor 47.

The shaft 26 has another spur gear 49 attached thereto which is meshed with a similar gear 50 on a shaft 51, to the outer end of which is attached the lower feed roll 52. The shaft 51 is journalled within a bore extending longitudinally within the lower feed roll bracket 53 which has spaced-apart intermediate portions 54 which are pivoted on pivot screws 55 to inturned flange portions 56 of the casing 25.

The bracket 53 has a forked inner portion 57 which has a recess 58 through which the vertically extending sleeve 59 passes. The lower portion of the sleeve has a washer 60 therearound in contact with the upper edge of the bracket portion 57. A coiled spring 61 extends around the sleeve between the washer 60 and an adjusting nut 62 which is threaded onto the upper portion of the sleeve below the locknut 63.

A rod 65 extends through the sleeve 59 and is attached at its upper end to a lever 66 which is attached to the previously described valve operating shaft 15. The lower end of the rod 65 is threaded into a pivot nut 69 which extends through a yoke 67 on one end of a lever 68, the other end of which is pivoted about a pivot shaft 70 which is attached to the casing 25. A treadle rod 71 which is connected at its lower end to a foot treadle 72 is connected to a shaft 73 which is journalled for rotation within the intermediate hub portion 74 of the lever 68.

The yoke 67 has spaced-apart, horizontally extending portions 75 and 76 above the pivot nut 69, the yoke portion 75 being just below the portion 57 of the lower feed roll bracket 53, and the yoke portion 76 being spaced below the yoke portion 75. The sleeve 59 passes through and is attached to the yoke portions 75 and 76. A cam 78 is located between the yoke portions 75 and 76, and has four cam sides A, B, C and D, one or the other of which contacts the upper edge of the yoke portion 76, the upper portion of the cam in all cam positions being spaced from the upper yoke portion 75. The cam 78 is attached to the inner end of a rotary shaft 79 which is journalled in the hub portion 80 of the yoke 67. The outer portion of the shaft 79 extends through the adjacent wall of the casing 25 and has the knob 81 attached to its outer end. The knob 81 has a pointer 82 which is positioned in front of a scale 83 which is calibrated in terms of pressure to be applied by the feed rolls to an outsole being handled.

The side A of the cam is nearest the shaft 79, the cam side B is spaced further from the shaft 79 than the side A is, the cam side C is spaced still further from the shaft 79, and the cam side D is spaced still further from the shaft 79. As the knob 81 is rotated in a clock-wise direction with respect to Fig. 5, cam sides spaced further from the shaft 79 will be moved against the upper edge of the yoke portion 76 causing the sleeve 59 to be moved further downwardly, compressing the spring 61 to a greater extent and causing more downward pressure to be applied to the inner end of the lower feed roll bracket 53. This causes the lower feed roll 52 on the outer end of the bracket 53 to move upwardly nearer the upper feed roll.

A conventional sole supporting plate 85 has a recessed inner portion through which the lower feed roll 52 extends, and is supported from the frame of the machine in a conventional manner below the lower end of the nozzle 16. An outsole 86 is moved by the feed rolls as is conventional so that an adhesive stripe 87 is ejected by the nozzle on its margin.

Supported around the drive shaft 33 is a sprocket 90 which is meshed with a chain 91 which, in turn, is meshed with an upper sprocket 92 on the rotary shaft of a gear pump 94. The sprocket 90 has attached thereto a driven clutch member 95 which is on one side of and is adapted to be engaged with a central driving clutch member 96 which is slidably keyed to the drive shaft 33. The clutch driving member 96 is attached to a clamp 93 which is movable through a shaft 97 by a hand lever 98 into and out of engagement with the clutch member 95.

Another driven clutch member 99 is attached to a gear 100 which is supported around the drive shaft 33 on the other side of the driving clutch member 96. The driven clutch member 99 is also adapted to be engaged with the driving clutch member 96 by movement of the lever 98. The gear 100 is meshed with a gear 101 which is attached to a sprocket 102. The gears 100 and 101 and the sprocket 102 are supported from the casing 25.

The sprocket 102 has a chain 103 meshed therewith and which is meshed with a sprocket 104 on the rotary shaft of a gear pump 105 which is connected to the bottom of the adhesive tank 11 and to one end of a hose 106 the other end of which is connected to another nozzle 16 within a solvent tank 107.

*Operation*

In operation, the motor 46 would drive continuously through the drive shaft 33, the lower feed roll 52, and through the shaft 33, the gears 32 and 31 and the shaft 26, the upper feed roll 27. Normally, with no outsole on the plate 85, the treadle 72 would be in its up position with the lower feed roll bracket 53 in its lower position. The valve 13 would be closed, and the handle 98 for cutting in one or the other of the pumps 94 or 105 would be in its mid-position with neither pump operating.

Assuming a leather sole is to be cemented first and has been placed properly upon the plate 85, the nozzle 16 connected to the leather adhesive tank 10 would be clamped in operating position as illustrated by the drawings. The lever 98 would be moved to actuate the clutch to drive the pump 94 connected to the tank 10. The knob 81 would be adjusted to the correct position for causing the lower feed roll to move up the proper distance to apply the correct pressure to the particular outsole being handled. The treadle 72 would then be depressed and would move the treadle rod downwardly, carrying with it the hub portion 74 of the pivoted lever 68, the inner end of which would move downwardly, carrying with it the pivot rod 69 which would pull down the rod 65, causing through the pressure of the spring 61, the inner end 57 of the lower feed roll bracket 53 to move downwardly. This would cause the bracket 53 to pivot about the pivot screws 55 and to move its outer end which carries the lower feed roll 52 to move upwardly causing the lower feed roll to press the sole being handled against the upper feed roll. The two feed rolls would then cause the sole to move in the usual manner on the plate 85.

At the same time, the down movement of the rod 65 would rotate through the lever 66, the valve operating shaft 15 which would open the valve 13, supplying adhesive from the tank 10 to be ejected by the nozzle 16 upon the edge of the outsole. At the end of the adhesive applying operation, the operator would release the treadle, following which the valve 13 would close, and the lower feed roll would move downwardly away from the sole, permitting the latter's removal.

Assuming now that a rubber sole is next to be coated with an adhesive, the operator would release the nozzle clamping screw 18, and would remove the pin 23 from the universal joint 14, permitting the previously used nozzle 16 to be removed and inserted within the solvent tank 108. The operator would then remove the other nozzle from the solvent tank 107 and clamp it in operating position, and connect its valve to the universal joint. The lever 98 would then be moved to actuate the clutch to engage the pump 105 connected to the rubber adhesive tank 11, and a rubber sole would be placed upon the plate 85. After proper adjustment of the knob 81 to take care of the particular rubber sole, the treadle would again be depressed. Then, the previously described sequence of operations would automatically take place, and the rubber sole would be coated with adhesive. At the end of the coating operation, the treadle would be released, and the rubber sole removed.

Adjustment of the knob 81 easily and quickly adapts the machine to handle four different ranges of sole thicknesses or hardnesses. More or fewer ranges could be provided. The use of two adhesive tanks and their associated components permits a single machine to handle two different types of soles, the previous handling of which required two machines. Thus, economies of space, labor and investment are achieved.

While one embodiment of the invention has been described for the purpose of illustration, it should be understood that the invention is not limited to the exact apparatus and arrangement of apparatus illustrated, since modifications thereof may be suggested by those skilled in the art, without departure from the essence of the invention.

What is claimed, is:

1. A machine for applying adhesive to shoe soles comprising a single frame, two adhesive containing tanks supported on said frame, a pump connected to each of said tanks, a hose connected to each of said pumps, a valve connected to each of said hoses, an adhesive applying nozzle attached to each of said valves, sole supporting means, quickly releasable means for supporting one of said nozzles and valves above said supporting means, a foot treadle for opening said one of said valves supported above said supporting means, means including quickly releasable means connecting said one valve to said treadle, a motor for driving said pumps, a central driving clutch means connected to said motor, driven clutch means connected to said pumps on opposite sides of said driving clutch means, and means including a handle slidable by an operator of the machine for selectively engaging said driving clutch means with one or the other of said driven clutch means.

2. In a machine for applying adhesives to shoe soles and having upper and lower feed rolls for rotating a sole, and having means for raising the lower feed roll for engaging a sole between said feed rolls, the combination of means for adjusting said raising means for varying the distance said lower roll is raised for permitting soles having different thicknesses and hardnesses to be engaged by said rolls, said adjusting means comprising a manually operated control knob, a cam connected to said knob, a cam follower for said cam, and resilient means connecting said cam follower to said raising means.

3. The invention claimed in claim 2 in which a calibrated scale is provided opposite said knob, and in which said knob is provided with an indicator movable along said scale when said knob is rotated for indicating the degree of adjustment provided by said cam.

References Cited in the file of this patent

UNITED STATES PATENTS

| | | |
|---|---|---|
| 2,042,479 | Newhall | June 2, 1936 |
| 2,073,647 | Newhall | Mar. 16, 1937 |
| 2,533,497 | Mulhern et al. | Dec. 12, 1950 |